United States Patent [19]

Frank et al.

[11] Patent Number: 5,656,055
[45] Date of Patent: Aug. 12, 1997

[54] SHEET SHAPING PRESS

[75] Inventors: Robert G. Frank, Sarver; Michael T. Fecik, Pittsburgh, both of Pa.; Jean Florean, Asseveni, France

[73] Assignee: PPG Industries, Inc., Pittsburgh, Pa.

[21] Appl. No.: 448,773

[22] Filed: May 24, 1995

[51] Int. Cl.$^6$ .............................. C03B 23/00; C03B 29/00
[52] U.S. Cl. .................................. 65/287; 65/273
[58] Field of Search ....................... 65/287, 273

[56] References Cited

U.S. PATENT DOCUMENTS

| | | | |
|---|---|---|---|
| 4,272,274 | 6/1981 | Frank et al. | 65/273 |
| 4,496,386 | 1/1985 | Hymore et al. | 65/106 |
| 4,518,411 | 5/1985 | Frank et al. | 65/106 |
| 4,589,901 | 5/1986 | Yoshizawa et al. | 65/107 |
| 4,606,749 | 8/1986 | Nushi et al. . | |
| 4,662,925 | 5/1987 | Thimons et al. | 65/104 |
| 4,682,925 | 7/1987 | Shields | 411/443 |
| 4,711,654 | 12/1987 | Iida | 65/172 |
| 4,749,399 | 6/1988 | Yamada et al. | 65/273 |
| 4,830,650 | 5/1989 | Kelly | 65/106 |
| 4,883,526 | 11/1989 | Enk et al. . | |
| 5,279,635 | 1/1994 | Flaugher et al. | 65/103 |
| 5,286,271 | 2/1994 | Rueter et al. | 65/106 |
| 5,292,356 | 3/1994 | Herrington et al. | 65/273 |

Primary Examiner—Donald E. Czaja
Assistant Examiner—Jacqueline A. Ruller
Attorney, Agent, or Firm—Andrew G. Siminerio

[57] ABSTRACT

The present invention provides a ring mold for shaping heat-softenable sheet material. The mold includes peripheral wall members enclosing a central cavity having an open upper end. The wall members have an upper sheet shaping surface with a peripheral shape and elevational contour that generally corresponds to a desired peripheral shape and elevational contour of a sheet to be shaped. A first set of slots are positioned along and extend through portions of one of the wall members and a second set of slots are positioned along and extend through portions of an opposing wall member. Each of the slots in the second set is generally horizontally aligned with a corresponding slot in the first set.

20 Claims, 2 Drawing Sheets

SHEET SHAPING PRESS

BACKGROUND OF THE INVENTION

This invention relates to bending heat-softenable sheet material and in particular to a novel mold configuration that provides consistent shaping of glass sheets.

Shaped and tempered glass sheets are widely used as side windows or rear windows in vehicles such as automobiles and the like. To be suitable for such applications, flat glass sheets must be shaped to precisely define curvatures dictated by the shape and outline of the frames defined in the window openings into which the glass side or rear windows are installed. It is also important that the rear or side windows meet stringent optical requirements and that the windows be free of optical defects and reflective distortion that would tend to interfere with a clear viewing therethrough in their viewing area. Commercial production of shaped glass sheets for such purposes commonly include heating flat sheets to their heat softening temperature, shaping the heated glass to a desired curvature and cooling the sheets in a controlled manner to a temperature below the annealing range of the glass, to increase the resistance of the glass to breakage. During such processing, a glass sheet is generally conveyed along a substantially horizontal path through a tunnel-type furnace, heated to its heat softening temperature and transferred into a shaping station adjacent the furnace where a glass sheet is shaped. After shaping, the glass sheet is transferred to a cooling station where it is controllably cooled. The heat-softened glass sheet may be shaped using the variety of bending techniques, which are well known in the art. For example, in U.S. Pat. No. 4,662,925, heat-softened glass sheets are shaped between full surface upper and lower molds. In U.S. Pat. No. 4,830,650, the lower mold is a continuous flexible ring-type mold. In U.S. Pat. Nos. 4,272,274 and 4,518,411, the lower mold includes a number of transversely extending shaping lands with conveying rolls positioned between each land.

Using the shaping equipment disclosed in these prior art patents may present several problems. For example, using full surface upper and lower shaping molds increases the probability of marking the major surfaces of the shaped glass sheet. In configurations where the lower pressing surface is a segmented or continuous bent metal rail supported from an underlying support structure, e.g. an adjustable support post, there is the problem of providing a contoured surface that precisely matches the corresponding portions of the upper shaping mold. Furthermore, the configuration of the bent metal shaping rail must be continually monitored and readjusted as required to maintain the proper contour of the shaping rail throughout the glass sheet shaping campaign. In pressing configurations which include pressing lands, there is an increased possibility of marking the interior surface portions of the glass sheet due to contact with the shaping lands.

It would be beneficial to the glass sheet shaping art to provide a shaping arrangement which does not require continuous adjustment and realignment of the heat shaping surfaces and provides a consistent shaping of the glass sheets from part to part.

SUMMARY OF THE INVENTION

The present invention provides a ring mold for shaping heat-softenable sheet material. The mold includes peripheral wall members enclosing a central cavity having an open upper end. The wall members have an upper sheet shaping surface with a peripheral shape and elevational contour that generally corresponds to a desired peripheral shape and elevational contour of a sheet to be shaped. A first set of slots are positioned along and extend through portions of one of the wall members and a second set of slots are positioned along and extend through portions of an opposing wall member. Each of the slots in the second set is generally horizontally aligned with a corresponding slot in the first set. In one particular embodiment of the invention, a non-marking, heat-resistant material is secured to the sheet shaping surface of said mold and the sheet shaping surface is configured such that the heat-resistant material contacts only a peripheral edge of the sheet to be shaped. Conveying rolls may be positioned within the mold cavity such that each end of a central shaft of the rolls extends through an aligned pair of slots.

DETAILED DESCRIPTION OF THE INVENTION

The present invention is illustrated with a glass sheet shaping system similar to that disclosed in U.S. Pat. No. 5,286,271, but may be used to shape other heat-softenable sheet material, such as plastics, and with other types of heat-softenable sheet material shaping systems.

Figure 1:
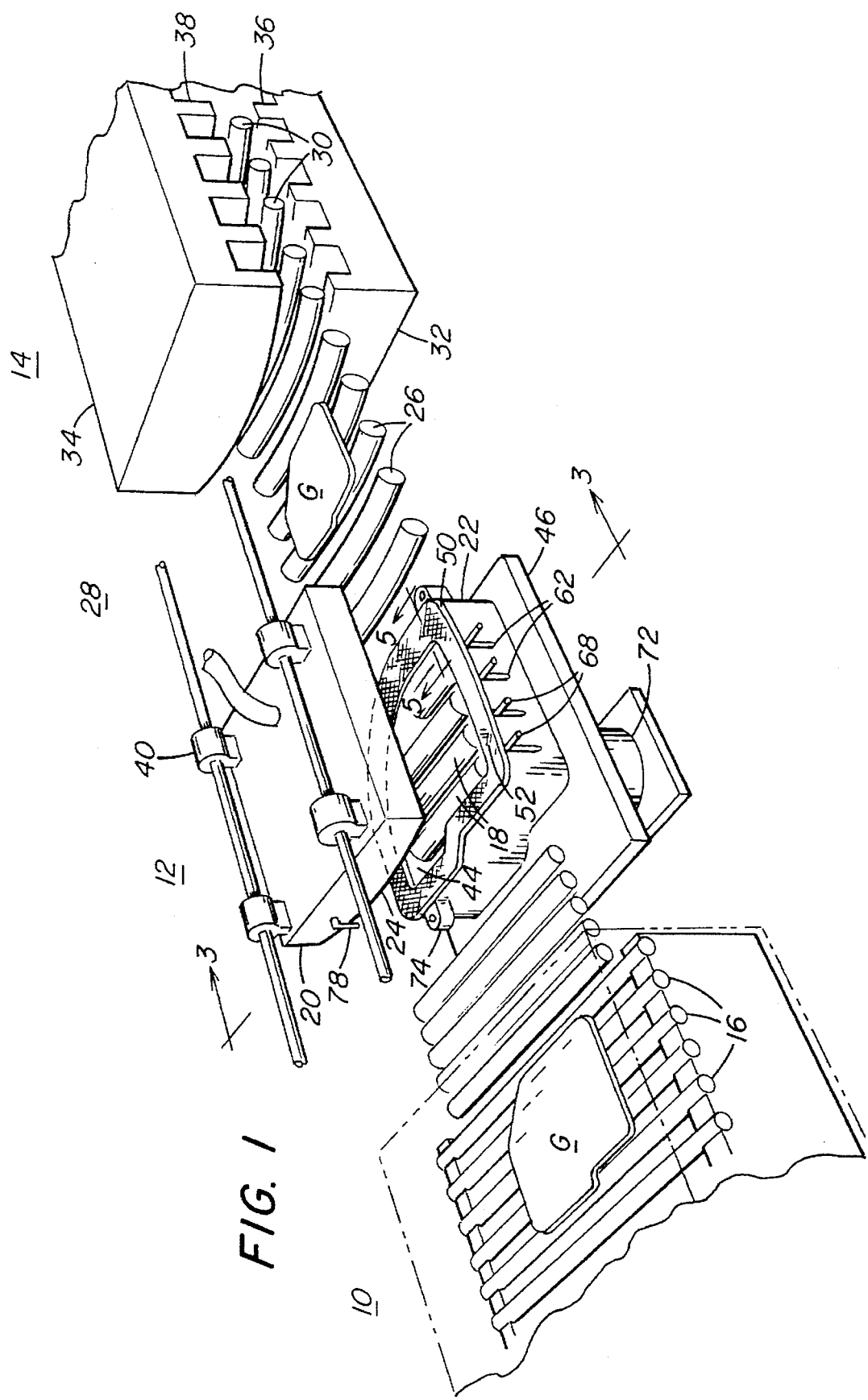
FIG. 1 is a perspective view of a glass sheet shaping arrangement incorporating the teachings of the present invention, with portions removed for clarity.

Referring to FIG. 1, an apparatus for shaping and heat treating glass sheets includes a tunnel-type furnace 10, a shaping station 12 and a cooling station 14. Glass sheets G are conveyed over a plurality of conveyor rolls 16 and 18 along a generally horizontal path from a loading station (not shown), through the furnace 10 to the shaping station 12 where the heat-softened glass sheet is shaped between an upper vacuum mold 20, of a type well known in the art, and a lower mold 22, which is the subject of the present invention. Vacuum is drawn along downwardly facing sheet shaping surface 24 of upper mold 20 to shape the sheet and hold it thereagainst after shaping. The mold 20 and shaped glass sheet G is then shuttled to a position above a series of transversely shaped conveying rolls 26 at a downstream transfer station 28. The rolls 26 have a transverse elevational curvature that generally corresponds to the transverse curvature of shaping surface 24. Vacuum along surface 24 is terminated and the shaped glass sheet G is deposited onto rolls 26 which, in turn, maintains the glass sheets shape as it is conveyed to the cooling station 14. The cooling station 14 includes a plurality of curved rolls 30 and plenums 32 and 34 which direct cooling fluid through nozzles 36 and 38, respectively, against the opposing major surfaces of the glass sheet G to controllably cool the sheet.

Although not limiting in the present invention, as an alternative to the above-described shaping arrangement, after the glass sheet G is pressed against and held by upper mold 20, the glass sheet may be transferred onto a tempering ring (not shown) and thereafter moved into a cooling station as disclosed in U.S. Pat. No. 4,830,650.

As discussed earlier, in the particular shaping arrangement illustrated in FIG. 1, the shaping station 12 includes upper vacuum shaping mold 20 and lower shaping mold 22. If desired, the shaping station may be enclosed and heated. Upper mold 20 is preferably composed of high temperature resistant, rigid material, for example, ceramic, iron, brass or stainless steel, and may be covered with a heat resistant cover 39, such as a glass fiber, aramid or stainless steel cloth. The downwardly facing shaping surface 24 of the mold 20 is shaped to conform with the shape desired for the glass sheet to be shaped. The upper mold 20 is horizontally movable via a shuttling arrangement 40, which may be similar to that disclosed in U.S. Pat. Nos. 4,662,925 and 4,767,434 or the like.

Figure 2:
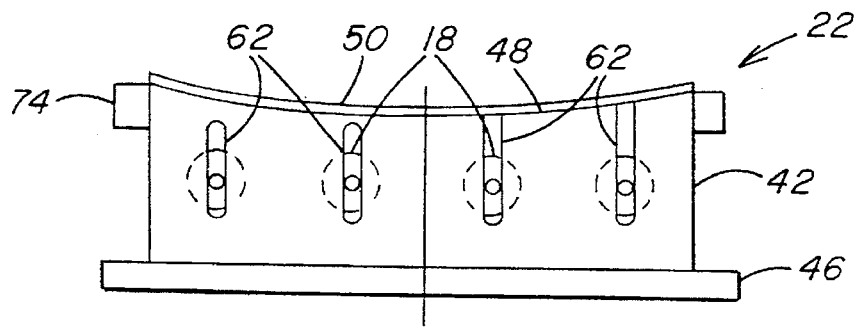
FIG. 2 is a side elevation of the lower shaping mold illustrated in FIG. 1, showing alternate embodiments of the present invention.
Figure 3:
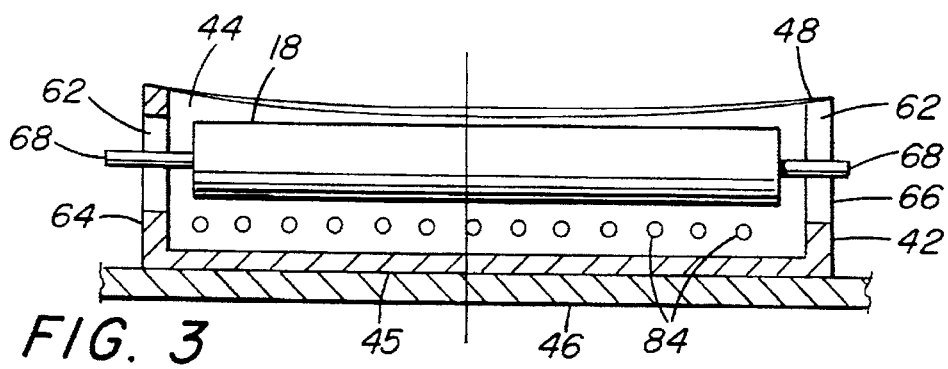
FIG. 3 is a sectional view taken along line 3—3 of FIG. 1, showing alternate embodiments of the present invention, with portions removed for clarity.

Referring to FIGS. 1, 2 and 3, the lower mold 22 is preferably a one-piece cast structure with a peripheral wall 42 surrounding a central cavity area 44 with an open upper end. If desired, mold 22 may include a bottom member 45 integral with the walls 42. The mold 22 is cast from a heat-resistant material, for example, aluminum, brass, cast iron, stainless steel or ceramic composite, and is secured to a mounting plate 46, e.g. using mounting bolts or clamps (not shown). The upper surface 48 of walls 42 forms the sheet shaping surface of the lower mold 22 and generally conforms to the desired peripheral shape and elevational contour of the sheet to be shaped. To protect the glass sheet G from marking when it is contacted by the lower mold 22, surface 48 may be covered with a non-marking, heat-resistant material 50, such as glass fiber, aramid or stainless steel cloth or pads, which may be secured to the surface 48 by contact cement. When a cover 50 is used, the contour of surface 48 of mold 22 may be compensated to account for the presence of the cover material. Although not required in the present invention, it is preferred to limit the contact between the surface 52 of cover 50 and the peripheral edge 54 and marginal area 56 of the glass sheet G. To this end, referring to FIG. 5, the sheet shaping surface 48 of mold 22 is contoured in cross-section so that only the edge 54 of sheet G contacts surface 52 of cover 50. Portion 60 of mold surface 48 is configured such that cover 50 remains below the marginal area 56 of the glass surface after the sheet G has been heated and pressed between upper mold 20 and lower mold 22. It should be appreciated that if a cover 50 is not used, surface 48 would be configured so that only the edge 54 of sheet G contacts surface 48 and portion 60 of surface 48 is spaced below the marginal area 56 of the glass surface after the sheet G has been shaped by upper mold 20 and lower mold 22. By limiting contact between sheet G and surface 52 of cover 50 (or surface 48 of mold wall 42 if cover 50 is not used), the potential for marking of the glass marginal area 56 is reduced.

Figure 4:
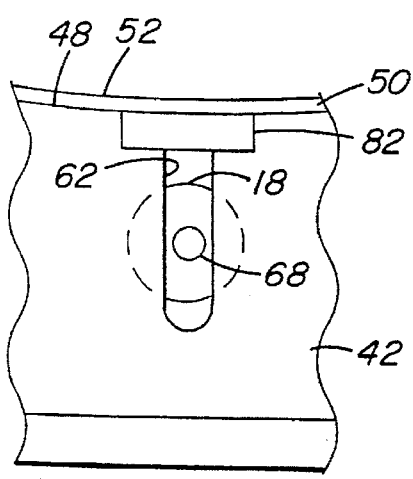
FIG. 4 is a side view similar to FIG. 2 showing an alternate embodiment of the present invention, with portions removed for clarity.

Within the shaping station 12, rolls 18 are arranged to support the transverse dimension of the heat-softened glass sheets G as each sheet exits the furnace 10 and enters the shaping station 12. Rolls 18 may be conventional, large diameter rolls with a center drive shaft, as shown in FIGS. 1–4, or a shaft covered with a heat resistant, non-marking fabric sleeve. Slots 62 are positioned in opposing sidewalls 64 and 66 of peripheral wall 42 as shown in FIG. 3 to receive the drive shafts 68 of the rolls 18. More specifically, each slot of a first set of slots in sidewall 64 is aligned with a corresponding slot in a second set of slots in sidewall 66. Each pair of slots 62 receives the drive shaft 68 of one of rolls 18 which are positioned within the outline of mold 22. The rolls 18 are driven in any convenient manner well known in the art (not shown) and are preferably positioned such that the plane along which the glass sheet G is conveyed on rolls 16 through furnace 10 is aligned with the plane along which rolls 18 convey the glass sheet G into the shaping station 12. The slots 62 allow the mold 22 and rolls 18 to move vertically relative to each other, as will be discussed later in more detail. The slots 62 may extend through mold surface 48 as shown in the right side of FIGS. 2 and 3 or may be completely enclosed by the sidewall structure as shown in the left side of FIGS. 2 and 3. In the embodiment of the invention shown in the right side of FIG. 2, material 50 may extend across the opening formed by the slots 62 as shown in FIG. 2, or the slot may remain uncovered. If desired, additional shaping members 70 may be inserted within the upper portion of slot 62 and secured to the sidewalls 42, as shown in FIG. 4, to provide a continuous shaping surface 48. In the embodiment of the invention shown in the left side of FIG. 2, mold surface 48 is continuous. It should be appreciated that thin vertical slits (not shown) may be cut through the shaping surface 48 and extend downward through a portion of mold walls 42 to provide expansion relief when the mold 22 is heated to an elevated temperature; however, for the purpose of this invention, the surface 48 would still be considered continuous, especially if cover 50 extends across the slit.

Referring to FIG. 1, mold 22 is moved relative to the rolls 18 by a lifter 72, for example, a pneumatic or electric cylinder. Lifter 72 vertically reciprocates the lower mold 22 from an initial position wherein the sheet shaping surface 48 is positioned below the plane along which support rolls 18 convey the heat-softened glass sheets G into the shaping station 12, to a second position above the support rolls 18 to lift the heat-softened glass sheet G off rolls 18 and toward shaping surface 24 of upper mold 20, as will be discussed later in more detail. It should be appreciated that as an alternative to moving mold 22 upward relative to the rolls 18 to transfer the glass sheet onto mold 22, the rolls 18 may be moved downwardly below the sheet shaping surface 48 of mold 22 to affect the transfer. Mold 22 would then move upward and/or upper mold 20 would move downward to press the heat-softened glass sheet G therebetween.

Figure 5:
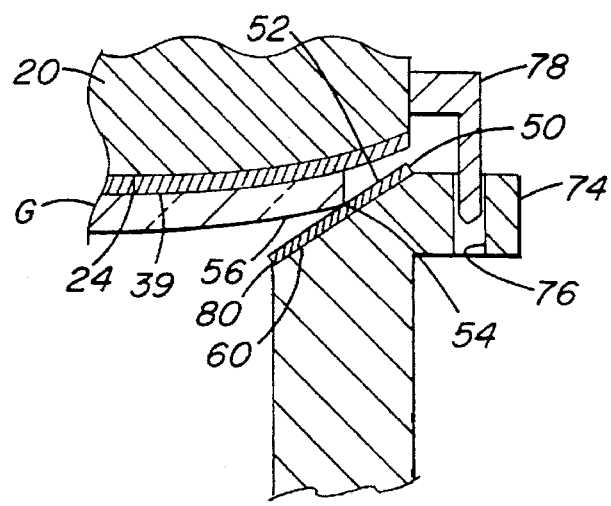
FIG. 5 is a sectional view taken along line 5—5 of FIG. 1 showing the upper and lower molds in a closed, sheet shaping arrangement, with portions removed for clarity.

Alignment members 74 with openings 76 may be positioned about the periphery of mold 22 to receive a pin 78 on upper mold 20. Pin 78 may be a temporary member used to align molds 20 and 22 during an initial set-up operation or it may be used to continuously position molds 20 and 22 during the pressing operation and ensure proper pressing alignment between the molds as shown in FIG. 5.

If desired, heating coils 84 may be positioned within cavity 44, as shown in FIG. 3, to maintain or provide additional heat to the mold 22 and/or central portions of the glass G during a shaping operation. Depending on the desired heat profile, the heaters 84 may be positioned in either direction within cavity In one particular embodiment of the invention, the mold 22 was constructed of 6061 cast aluminum and had a wall 42 and bottom member 45 thickness of approximately 1.25 in. (3.18 cm). Surface 48 was covered with a 0.060 in. (0.15 mm) thick pad 50 of Kevlar® aramid fabric, available from E. I. DuPont de Nemours, Inc., Delaware, and was generally contoured such that surface 52 of pad 50 contacted the peripheral edge 54 of the glass sheet G, and the marginal area 54 of the shaped sheet directly over the inner edge 80 of mold 22 was approximately 0.020 in. (0.50 mm) above a corresponding portion of pad 50. Walls 42 were approximately 10 in. (25.4 cm) high. The slots 62 were 1.25 in. (3.18 cm) wide, had a minimum depth of about 6.25 in. (15.88 cm) and were positioned at 5 in. (12.7 cm) centers. The upper end of the slots 62 were not covered by pad 50. The rolls 18, which supported the glass sheet G within the outline of mold 22, were 0.75 in. (1.91 cm) diameter stainless steel shafts covered with a heat-resistant fabric cover, for example, Kevlar® aramid fabric. The shafts 68 extended through slots 62. As discussed earlier, the covered shafts may be replaced with a larger diameter conveying roll having a small diameter drive shaft that extends through slots 62.

It was also found that additional spacing between the innermost edge 80 of surface 48 and marginal portion 56 of the shaped glass sheet G along a long edge of the sheet G aided in eliminating marking of the glass. In one particular embodiment of the invention, the distance between the marginal area 56 of the glass sheet G directly over inner edge 80 of mold 22 and the corresponding portion of cover 50 was gradually increased along a longitudinal side of the mold 22 from 0.020 in. (0.50 mm) at the opposing ends of the side to 0.030 in. (0.75 mm) at the center of the longitudinal side.

During operation of the particular sheet shaping assembly discussed above, each glass sheet G is supported across its width on successive rolls 16 and conveyed through furnace 10 where it is heated to its softening point temperature. The heated glass sheet G then exits the furnace 10 and is conveyed onto rolls 18 in the shaping station 12. The lower mold 22 is initially positioned below the upper conveying surface of support rolls 18 so that the glass sheet G may be conveyed into the shaping station 12 without any interference. When the glass sheet G is in proper position between upper mold 20 and lower mold 22, lifter 72 moves lower mold 22 upward to contact the edge 54 of the glass sheet G, lifting the glass sheet G off the rolls 18. If desired, the movement of sheet G into the shaping station 12 may be slowed or stopped to ensure proper positioning of the sheet G between the molds 20 and 22. The lower mold 22 continues to move upward to press the edge 54 of the heat-softened glass sheet G against upper mold 20. Vacuum is drawn along surface 24 of mold 20 to shape the central portions of the glass sheet G. After shaping, the lower mold 22 is lowered and the shaped glass sheet G is held against upper mold 20 by the vacuum. Shuttling arrangement 40 is actuated to move the upper mold 20 and glass sheet G downstream from the shaping station 12 to the transfer station 28, preferably at a speed on the order of the conveying speed of the transversely shaped conveyor rolls 30. Upon arrival at transfer station 28 and while mold 20 and shaped sheet G is still moving, the vacuum along surface 24 is terminated and the shaped glass sheet G is released and dropped a short vertical distance directly onto the rolls 30, which are rotating at the time of transfer, to move the shaped glass sheet to the cooling station 14. Once unloaded, the upper vacuum mold 20 stops its downstream motion and returns to its original position within the shaping station 12 to await the arrival of the next glass sheet G.

The lower mold 22 presented herein provides several advantages over prior art molds that use a segmented or continuous pressing surface. First, mold 22's ring configuration contacts only the marginal area of the sheet G, and preferably only the peripheral edge, to eliminate mold marking along the central areas of the lower surface of the sheet G and minimize any marking about the sheet's periphery. Also, surface 48 of the mold 22 may be machined to give the precise contour required to match the corresponding peripheral portions of the upper mold 20 and provide the desired elevational shape for the glass sheet G. In addition, because of the mold's cast design, the overall structure is more rigid than other bent metal ring configurations and therefore less susceptible to warping and misalignment due to handling. Furthermore, since the shaping surface 48 is integral with the walls 42, the shape of surface 48 will remain stable over an extended shaping campaign. As a result, the shape of a glass sheet G formed by the mold 22 of the present invention is more accurate and is more consistent from shaped sheet to sheet than a continuous or segmented ring, whose shaping surface must be periodically adjusted at each individual support post to maintain proper positioning and configuration with respect to the upper mold 20. Also, due to mold 22's one-piece construction, it will expand uniformly in all dimensions; therefore, if desired, the design of the mold 22 may be compensated to account for the anticipated expansion of the mold 22 when placed in a high-temperature environment. It should be appreciated that the mold 22 may be divided into more than one section. Each section will be more rigid and therefore less susceptible to warping, will expand uniformly and will have a rigid shaping surface that provides consistent sheet shaping over an extended shaping campaign; however, with this particular embodiment of the invention, care must be taken to ensure that the individual sections remain aligned.

The forms of the invention shown and described in this specification represent illustrative preferred embodiments and it is understood that various changes may be made without departing from the spirit of the invention as defined in the following claimed subject matter.

We claim:

1. A mold for shaping heat-softenable sheet material, comprising:

peripheral wall members enclosing a central cavity having an open upper end, wherein said wall members have an upper sheet shaping surface configured to contact and support a sheet to be shaped about said sheet's periphery and further wherein said upper sheet shaping surface of said wall members has a peripheral shape and elevational contour generally corresponding to a desired peripheral shape and elevational contour of said sheet to be shaped;

a first set of slots positioned along and extending through portions of one of said wall members; and a second set of slots positioned along and extending through portions of an opposing wall member, wherein each of said second set of slots is generally horizontally aligned with a corresponding one of said first set of slots.

2. A mold for shaping heat-softenable sheet material, comprising:

peripheral wall members enclosing a central cavity having an open upper end, wherein said wall members have an upper sheet shaping surface configured to contact and support a sheet to be shaped about said sheet's periphery and further wherein said upper sheet shaping surface of said wall members has a peripheral shape and elevational contour generally corresponding to a desired peripheral shape and elevational contour of said sheet to be shaped, and said open upper end of said central cavity is free from any sheet contacting surface;

a first set of slots positioned along and extending through portions of one of said wall members; and a second set of slots positioned along and extending through portions of an opposing wall member, wherein each of said second set of slots is generally horizontally aligned with a corresponding one of said first set of slots.

3. A mold for shaping heat-softenable sheet material, comprising:

peripheral wall members enclosing a central cavity having an open upper end, wherein said wall members have an upper sheet shaping surface configured to contact and support only a peripheral edge of a sheet to be shaped and further wherein said upper sheet shaping surface of said wall members has a peripheral shape and elevational contour generally corresponding to a desired peripheral shape and elevational contour of said sheet to be shaped;

a first set of slots positioned along and extending through portions of one of said wall members; and a second set of slots positioned along and extending through portions of an opposing wall member, wherein each of said second set of slots is generally horizontally aligned with a corresponding one of said first set of slots.

4. The mold as in claim 3 further including a plurality of conveying rolls positioned within said cavity, each of said rolls having a sheet conveying surface and a central shaft, one end of which extends through one of said slots in said first set of slots and an opposite end which extends through a corresponding slot in said second set of slots, and means to vertically reciprocate said mold between a first position, wherein said sheet shaping surface is below selected portions of said sheet conveying surface of said rolls, and a second position, wherein said sheet shaping surface is above said selected portions of said sheet conveying surface of said rolls.

5. The mold as in claim 4 wherein an innermost edge of said sheet shaping surface is spaced at least about 0.50 mm below a marginal area of a shaped sheet immediately above said innermost edge.

6. The mold as in claim 5 wherein said sheet shaping surface of said mold includes a non-marking, heat-resistant cover and said sheet shaping surface is configured such that said heat-resistant cover contacts only a peripheral edge of said sheet to be shaped.

7. The mold as in claim 6 wherein said wall members are made of a material selected from the group consisting of brass, stainless steel, cast iron, ceramic composite and aluminum.

8. The mold as in claim 2 wherein said sets of slots extend through said sheet shaping surface.

9. The mold as in claim 2 wherein said sheet shaping surface of said mold is continuous.

10. The mold as in claim 2 further including heaters positioned within said cavity, below said sheet shaping surface of said mold.

11. The mold as in claim 2 wherein said sheet shaping surface is configured such that said surface contacts only a peripheral edge of said sheet to be shaped.

12. The mold as in claim 11 wherein an innermost edge of said sheet shaping surface is spaced at least about 0.50 mm below a marginal area of a shaped sheet immediately above said innermost edge.

13. The mold as in claim 2 further including a non-marking, heat-resistant material secured to said sheet shaping surface of said mold.

14. The mold as in claim 13 wherein said sheet shaping surface is configured such that said heat-resistant material contacts only a peripheral edge of said sheet to be shaped.

15. The mold as in claim 14 wherein said heat-resistant material is spaced at least about 0.50 mm below a marginal area of a shaped sheet immediately above an innermost edge of said sheet shaping surface.

16. The mold as in claim 2 further including a plurality of conveying rolls positioned within said cavity, each of said rolls having a sheet conveying surface and a central shaft, one end of which extends through one of said slots in said first set of slots and an opposite end which extends through a corresponding slot in said second set of slots.

17. The mold as in claim 16 further including means to vertically reciprocate said mold between a first position, wherein said sheet shaping surface is below selected portions of said sheet conveying surface of said rolls, and a second position, wherein said sheet shaping surface is above said selected portions of said sheet conveying surface of said rolls.

18. The mold as in claim 2 wherein said wall members are made of a material selected from the group consisting of brass, stainless steel, cast iron, ceramic composite and aluminum.

19. The mold as in claim 18 further including a non-marking, heat-resistant material secured to said sheet shaping surface of said mold and wherein said sheet shaping surface is configured such that said heat-resistant material contacts only a peripheral edge of said sheet to be shaped.

20. The mold as in claim 19 further including a plurality of conveying rolls positioned within said cavity, each of said rolls having a sheet conveying surface and a central shaft, one end of which extends through one of said slots in said first set of slots and an opposite end which extends through a corresponding slot in said second set of slots, and means to vertically reciprocate said mold between a first position, wherein said sheet shaping surface is below selected portions of said sheet conveying surface of said rolls, and a second position, wherein said sheet shaping surface is above said selected portions of said sheet conveying surface of said rolls.

* * * * *